(12) United States Patent
Weller et al.

(10) Patent No.: US 9,084,979 B2
(45) Date of Patent: Jul. 21, 2015

(54) REACTOR FOR THE MANUFACTURE OF NANOPARTICLES

(75) Inventors: Horst Weller, Hamburg (DE); Jan Niehaus, Hamburg (DE)

(73) Assignee: CENTRUM FUR ANGEWANDTE NANOTECHNOLOGIE (CAN) GMBH, Hamburg (DE)

( * ) Notice: Subject to any disclaimer, the term of this patent is extended or adjusted under 35 U.S.C. 154(b) by 1166 days.

(21) Appl. No.: 12/866,739

(22) PCT Filed: Feb. 11, 2009

(86) PCT No.: PCT/EP2009/051539
§ 371 (c)(1),
(2), (4) Date: Oct. 7, 2010

(87) PCT Pub. No.: WO2009/101091
PCT Pub. Date: Aug. 20, 2009

(65) Prior Publication Data
US 2011/0042611 A1 Feb. 24, 2011

(30) Foreign Application Priority Data
Feb. 11, 2008 (GB) .................... 0803378.9

(51) Int. Cl.
*B82Y 40/00* (2011.01)
*B82Y 30/00* (2011.01)
*B01J 19/24* (2006.01)

(52) U.S. Cl.
CPC ............. *B01J 19/24* (2013.01); *B82Y 30/00* (2013.01); *B82Y 40/00* (2013.01); *B01J 2219/00159* (2013.01)

(58) Field of Classification Search
USPC ...................... 117/68, 70, 200, 201
See application file for complete search history.

(56) References Cited

U.S. PATENT DOCUMENTS

| | | | |
|---|---|---|---|
| 6,179,912 B1 | 1/2001 | Barbera-Guillem et al. |
| 6,682,596 B2 | 1/2004 | Zehnder et al. |
| 7,144,458 B2 | 12/2006 | Zehnder et al. |
| 8,076,846 B2 | 12/2011 | Mizuno et al. |
| 2005/0112849 A1 | 5/2005 | Stott et al. |

(Continued)

FOREIGN PATENT DOCUMENTS

| | | |
|---|---|---|
| CN | 1912048 A | 8/2006 |
| GB | 2429838 A | 3/2007 |

(Continued)

OTHER PUBLICATIONS

Nakamura, H. et al., "Preparation of CdSe nanocrystals in a microflow-reactor", Chem. Comm., 2002, pp. 2844-2845.

(Continued)

*Primary Examiner* — Robert M Kunemund
(74) *Attorney, Agent, or Firm* — Hultquist, PLLC; Steven J. Hultquist; Mary B. Grant

(57) ABSTRACT

An apparatus (10) and a method (200) for the manufacture of nanoparticles. The apparatus and the method allows for the nucleation and growth of nanoparticles at independent temperatures. The independent temperatures allow for the growth of nanoparticles in a controlled environment avoiding spontaneous nucleation and allowing particle sizes to be controlled and facilitating the manufacture of particles of a substantially uniform size. Furthermore the apparatus (10) allows for the manufacture of core-shell nanoparticles and core-shell-shell nanoparticles.

30 Claims, 5 Drawing Sheets

(56) References Cited

U.S. PATENT DOCUMENTS

| | | |
|---|---|---|
| 2005/0129580 A1 | 6/2005 | Swinehart et al. |
| 2005/0238568 A1 | 10/2005 | Yu et al. |
| 2006/0028882 A1* | 2/2006 | Qu ........................ 365/189.07 |
| 2007/0128350 A1 | 6/2007 | Nakamura et al. |
| 2007/0276165 A1* | 11/2007 | Gutsche et al. ............ 568/959 |
| 2009/0295005 A1 | 12/2009 | Rauscher et al. |
| 2014/0091257 A1 | 4/2014 | O'Brien, et al. |

FOREIGN PATENT DOCUMENTS

| | | |
|---|---|---|
| JP | 2-43902 A | 2/1990 |
| JP | 2001-129389 A | 5/2001 |
| JP | 2004-45098 A | 2/2004 |
| JP | 2005-21724 A | 1/2005 |
| JP | 2005-185877 A | 7/2005 |
| JP | 2005-240099 A | 9/2005 |
| JP | 2007-69162 A | 3/2007 |
| JP | 2007-204354 A | 8/2007 |
| JP | 2007-537886 A | 12/2007 |
| JP | 2008-168197 A | 7/2008 |
| JP | 2009-13353 A | 1/2009 |
| JP | 2010-510056 A | 4/2010 |
| WO | 0247117 A2 | 6/2002 |
| WO | 2005023704 A1 | 3/2005 |
| WO | 2006116337 A2 | 11/2006 |

OTHER PUBLICATIONS

Yen, B. et al.,"A Continuous-Flow Microcapillary Reactor for the Preparation of a Size Series of CdSe Nanocrystals", Advanced Materials, Nov. 4, 2003, vol. 15, No. 21, pp. 1858-1862.

Chan, E. et al., "Size-Controlled Growth of CdSe Nanocrystals in Microfluidic Reactors", Nano Letters, 2003, vol. 3, No. 2, pp. 199-201.

Wang, CM et al., "Morphology and Oxide Shell Structure of Iron Nanoparticles Grown by Sputter—Gas—Aggregation," Nanotechnology, May 29, 2007, pp. 1-7.

Holister, P. et al., "Nanoparticles—Technology White Papers nr. 3", Cientifica, Oct. 2003, pp. 1-11.

* cited by examiner

REACTOR FOR THE MANUFACTURE OF NANOPARTICLES

CROSS REFERENCE TO RELATED APPLICATIONS

The present application is a U.S. national phase under the provisions of 35 U.S.C. §371 of International Patent Application No. PCT/EP09/51539 filed on 11 Feb. 2009, which in turn claims the priority of United Kingdom Patent Application No. 0803378.9 which was filed on 11 Feb. 2008. The disclosures of such international patent application and United Kingdom priority patent application are hereby incorporated herein by reference in their respective entireties, for all purposes.

FIELD OF INVENTION

The present application relates to an apparatus and a method for the manufacture of nanoparticles.

PRIOR ART

The manufacture of nanoparticles using an apparatus is known in the literature.

U.S. Pat. No. 7,144,458 is titled: Flow Synthesis of Quantum Dot Nanocrystals; and is assigned to Invitrogen Corporation. The '458 patent teaches nanocrystalline materials and methods for the manufacture of the nanocrystalline materials. The '458 patent disclosure relates to nanocrystals which are synthesised with a high degree of control over reaction conditions and consequently product quality using a flow-through reactor. The reaction conditions in the flow through reactor are maintained by on-line detection of characteristic properties of the product and by adjusting the reaction conditions. The coating of the nanocrystals is achieved in a similar manner. Moreover the invention lies in the method and apparatus for the production of monodisperse luminescent semiconductor nanocrystals, for the application of a coating to a nanocrystal core.

A US patent publication No. 2005/0129580 is titled; Microfluidic Chemical Reactor for the Manufacture of Chemically Produced Nanoparticles; by Swinehart et al. The Swinehart et al. document discloses microfluidic modules for the manufacture of nanocrystalline materials in a continuous flow process. The microfluidic modules include one or more flow paths with mixing structures and one or more controlled heat exchangers to process the nanocrystalline materials and reagents in the flow path. The microfluidic modules can be interconnected to form microfluidic reactors that incorporate one or more process functions such as nucleation, growth and purification.

A U.S. Pat. No. 6,179,912 is titled; Continuous Flow Process for the Production of Semiconductor Nanocrystals; and is assigned to BioCrystal Ltd in the USA. The BioCrystal document discloses a system and continuous flow process for manufacturing monodisperse semiconductor nanoparticles. The system comprising reservoirs for the starting materials, a mixing path in which the starting materials are mixed, a first reactor in which the mixture of starting materials is mixed with a co-ordinating solvent and in which nucleation of the nanoparticles occurs. The system comprises a second reactor where controlled growth occurs, and a growth termination path in which the growth of the nanocrystals is halted.

An article in the academic journal Chem. Comm. 2002, 2844-2845 is titled; Preparation of CdSe nanocrystals in a Micro-Flow Reactor, by Makumura, Yamaguchi et al. The Chem. Comm. document discloses the use of a micro-reactor for continuous and controlled manufacture of CdSe nanocrystals. The Chem. Comm. document discloses the effects of the reaction conditions on the optical properties of the manufactured nanocrystals. The Chem. Comm. document discloses that in the rector, rapid and exact temperature control of the micro-reactor is beneficial for controlling particle diameter and reproducible manufacture of the nanoparticles.

International patent application publication No. WO 2006/116337 is titled; Doped semiconductor nanocrystals and methods for making the same. The '337 document is owned by the board of trustees of the University of Arkansas, USA. The '337 document discloses a method of synthesising doped semiconductor nanocrystals. The method includes the steps of combining a metal oxide or metal salt precursor, a ligand, and a solvent to form a metal complex in a reaction vessel; admixing an anionic precursor with the metal complex at a first temperature T1, sufficient to form a plurality of host nanocrystals. A metal dopant is doped onto the plurality of the host nanocrystals at a second temperature T2, such that a layer of the metal dopant is formed substantially over the surface of a host nanocrystal that receives a metal dopant. A mixture is added, having the anionic precursor and the metal oxide or metal salt precursor at a third temperature, T3 into the reaction vessel to allow re-growth of the host nanocrystal on the surface of the layer of the metal dopant formed substantially over the surface of a host nanocrystal that receive a metal dopant to form a plurality of doped nanocrystals, wherein the doped nanocrystals, show a characteristic of a semiconductor.

UK patent application publication No. GB 2429838 is titled; Nanoparticles and is owned by Nanoco Technologies Limited, UK. The Nanoco document discloses a method for the manufacture of a nanoparticle comprised of core, first shell and second shell semiconductor materials. At least one of the core, first shell and second shell materials incorporate ions from groups 12 and 15, 14 and 16, or 11, 13 and 16 of the periodic table.

Chinese patent application publication No. CN 1912048 is titled, Preparation method of InP quantum dots and is owned by the Huazhong University of Science and Technology. The translated abstract of the Huazhong document discloses a method for the manufacture of InP quantum dots comprising the steps of 1) Mixing $InCl_3$ with trioctyl phosphine oxide to prepare a solution of concentration 0.1-0.3 mol/L whilst maintaining a temperature of 90-110° C. 2) Increasing the temperature to 130-180° C. under an atmosphere of Argon. 3) Injecting $P(Si(CH_3)_3)_3$ into the solution in a molar ratio of 1 to 1-1 to 2. 4) Raising the temperature of the resultant orange solution to 260-270° C. 5) Lowering the temperature to 90-110° C. and injecting dodecylamine, decyl amine or mercaptan. 6) Dissolving the reaction mixture in a non-polar solvent to form a colloidal solution, then adding a polar solvent until the colloidal solution turns cloudy, and centrifugally separating the deposit from the supernatant to yield the InP quantum dots.

U.S. Patent Application Publication No. 2007/0276165 relates to a microreactor for the ozonolysis of unsaturated compounds. The microreactor has dimensions in the μm range and is arranged in modules and provides one or more mixing zone(s) that may be heated independently.

U.S. Patent Application Publication No. 2005/0112849 describes nanocrystals and a method for the continuous preparation thereof, comprising mixing an M-source and an X-donor in a mixing zone, heating the mixture in a reaction zone and transporting the mixture to a growth stopping zone.

U.S. Patent Application Publication No. 2006/0028882 describes a method for preparing nanocrystals with pre-determined wavelength, comprising mixing a first solvent and second solvent to obtain a precursor solution and heating the precursor solution to produce the nanocrystals.

None of the prior art discloses an apparatus and a method for the manufacture of nanoparticles as disclosed by the teachings of the present invention.

BACKGROUND OF INVENTION

A nanomaterial is classified depending upon its size in a particular dimension. If the nanomaterial has three dimensions of less than 100 nm then the nanomaterial can be in the form of a nanoparticle, a quantum dot or a hollow sphere. If the nanomaterial has two dimensions of less than 100 nm then the nanomaterial can be a nanotube, a nanowire or a nanofibre. If the nanomaterial has one dimension less than 100 nm then the nanomaterial will be in the form of a nanofilm or a nanolayer. A nanoparticle may also be referred to as a nanopowder, a nanocluster or a nanocrystal.

Over recent years the study of nanoparticles has received great interest due to unique properties of the nanoparticles. The physical properties of the nanoparticles differ fundamentally from those of the corresponding bulk materials. These different physical properties of the nanoparticles are due to the reduced dimensionality of the nanoparticles which lies between that of a macromolecular substance and that of an atomic substance. The divergence in the physical properties from the bulk material to the nanoparticle material is due to the increase in the ratio of the surface area to volume and the size of the nanoparticle, moving into a realm where quantum effects dominate. The increase in the surface area to volume ratio which is a gradual progression as the nanoparticle gets smaller, leads to an increasing dominance of the behaviour of the atoms on the surface of a nanoparticle over that of the atoms that are in the interior of the nanoparticle.

The quantum effects phenomenon not only affects the properties of the nanoparticle in isolation but also the properties of the nanoparticle during interaction with other materials. Therefore nanoparticles have received much interest in research where large surface area is needed, such as in the fields of catalysis, electrodes, semiconductors, optical devices and fuel cells.

Another feature of nanoparticles is that the nanoparticles provide unique properties that distinguish bulk materials from those of their nanoparticle counterparts. Such unique properties are for example increased strength, increased chemical resistance and increased heat resistance. For example, the bending of copper wire occurs with the movement of copper wire at the 50 nm scale, copper nanoparticles are super hard and do not exhibit the same malleability as the bulk material. A further example is silicon whereby perfectly formed silicon nanospheres with a diameter between 40-100 nm was shown not to be just harder than bulk silicon but its hardness falling between that of sapphire and diamond, therefore making the silicon nanospheres one of the hardest materials known.

Another property of the nanoparticles lies in the fact that once the nanoparticles become small enough, the nanoparticles display quantum mechanical behavior. Such nanoparticles are often referred to as quantum dots or artificial atoms because free electrons within the nanoparticles behave in a manner similar to electrons that are bound to an atom, in that the nanoparticles can occupy certain permitted energy states. Consequently much research is being undertaken on nanoparticles for implementation and use as semiconductors.

A further feature of the nanoparticles is that they have a critical wavelength below that of visible light. The nanoparticles do not scatter visible light, but may also absorb visible light. These absorption properties of the nanoparticles, has seen the nanoparticles employed as a material in applications such as packaging, cosmetics and coatings.

Currently, several methods exist for the manufacture of nanoparticles. Examples of methods for the manufacture of nanoparticles include vapour condensation, chemical synthesis and attrition. A common factor exists in all manufacture methods in that the manufacture parameters are essential for determining the size of the nanoparticles. The manufacture parameters being, for example, temperature, time, and reaction phase. During the manufacture of nanoparticles the manufacture parameters are usually manipulated to provide nanoparticles of a desired size.

The manufacture of nanoparticles by vapour condensation methods, involves the evaporation of a solid material followed by the rapid condensation of the material to form the nanoparticles. Altering the medium into which the vapour is formed affects the size of the manufactured nanoparticles. The evaporation of the solid material and the manufacture of the nanoparticle usually conducted in an inert atmosphere to prevent any possible side reactions, such as the formation of oxides of the materials used. In vapour condensation methods the nanoparticle size is dependant on the apparatus environment and is influenced by the temperature, the gas atmosphere and the rate of evaporation of the material in which the vapour condensation process is conducted. A number of variations of vapour condensation methods exist. A variation being vacuum evaporation on running liquids (VERL). The VERL method utilises a film of viscous material (such as an oil or a polymer) within a rotating drum which is under a vacuum environment. The desired materials are then evaporated into the vacuum whereby they form the desired nanoparticles in a suspension of the viscous material. A further variation of the vapour condensation method is called chemical vapour deposition (CVD). The CVD technique is generally employed in large scale processes for the manufacture of integrated circuits, whereby the nanoparticles are used as semiconductors. In the CVD method, the materials be them liquid or gas are both put in a vaporisation reactor and then subsequently condensed to form the desired nanoparticles.

The chemical synthesis method for the manufacture of the nanoparticles is probably the most popular. The chemical synthesis method allows for low-cost and high volume manufacture of highly mono-disperse nanoparticles. The chemical synthesis method involves the growth of the nanoparticles in a liquid that contains the material reactants. An example of the chemical synthesis method is the sol-gel approach which is often used to manufacture quantum dots. Chemical synthesis methods for the manufacture of nanoparticles are often better than the vapour condensation methods, especially where a certain shape of the nanoparticle is desired. A problem with the chemical synthesis methods for the manufacture of the nanoparticles arises because contamination of the nanoparticles is often observed. The contamination of the nanoparticles is due to precursor substances. Such contamination of the manufactured nanoparticles leads to problems when the nanoparticles are used as surface coatings in sintering methods. Surface coating using sintering methods requires contamination free material to be successful.

Attrition methods for the manufacture of nanoparticles are usually undertaken when the manufacture methods using vapour condensation or chemical synthesis are unsuccessful or when high amounts of low quality nanoparticles with a broad size distribution are needed. Attrition methods utilise the grinding or milling of the material from which the nanoparticle is sought. The milling is usually conducted in a ball mill, a planetary ball mill or other size reducing mechanism. Like the chemical synthesis method for the manufacture of nanoparticles, attrition methods lead to contamination of the nanopartides due the milling material. A further disadvantage is the broad size distribution of the nanoparticle and the limited size range, because in most cases nanoparticles with a diameter smaller than 50 nm cannot be manufactured with attrition methods.

Since the nanoparticles need to be manufactured to a specific size, which leads to their unique properties, they need to be characterised accordingly. Characterisation of the nanoparticles is fundamental to understand and control the manufacture of the nanoparticles. Characterisation of the nanoparticles is usually performed by common analytic techniques such as electron microscopy, atomic force microscopy, x-ray photoelectron spectroscopy, powder x-ray diffractometery, dynamic light scattering and absorption, emission and Fourier Transform infrared spectroscopy.

As the market for nanoparticles continues to rapidly expand due their highly desirable unique properties, the demands for high output, high purity and well defined nanoparticles at low cost expands too. This demand has therefore led to the need for the development of novel manufacturing methods and apparatus for nanoparticles.

SUMMARY OF INVENTION

The present invention teaches a method and an apparatus for the manufacture of nanoparticles.

The apparatus comprises a least one solvent preparation module connected in series to at least one particle synthesis module. The particle synthesis module comprises three independently heat able chambers.

The three independently heatable chambers include a separate preheating chamber, a separate nucleation chamber and a separate growth chamber. The three independently heatable chambers allow for the manipulation of the growth parameters for the manufacture of the nanoparticles ensuring that the manufactured nanoparticles are of substantially accurate size and uniform size.

In a further aspect of the present invention, a particle isolation module is used to isolate manufactured nanoparticles by the use of a flow centrifuge.

DETAILED DESCRIPTION

For a complete understanding of the present invention and the advantages thereof, reference is now made to the following description taken in conjunction with the figures.

It should be appreciated that the aspects of the invention discussed herein are merely illustrative of specific ways to make and use the invention, and do not therefore limit the scope of the invention when taken in consideration with the claims and description.

Figure 1A:
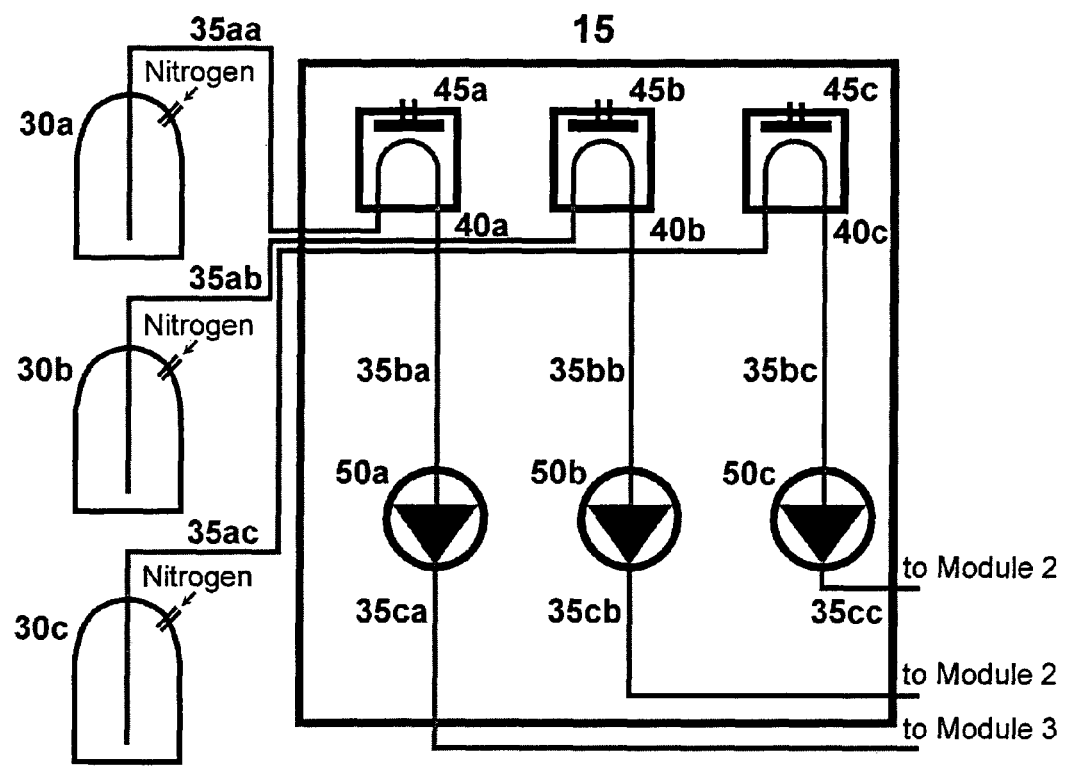
FIG. 1 depicts an apparatus for the manufacture of nanoparticles according to the present invention.
Figure 1B:
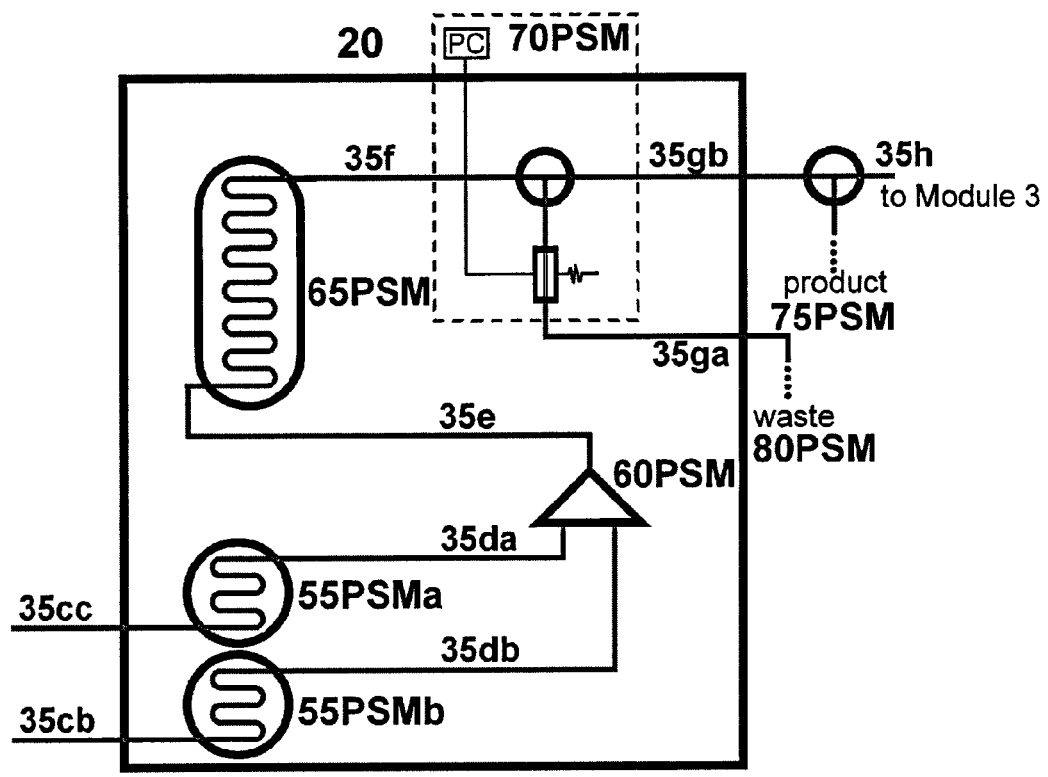
Figure 1C:
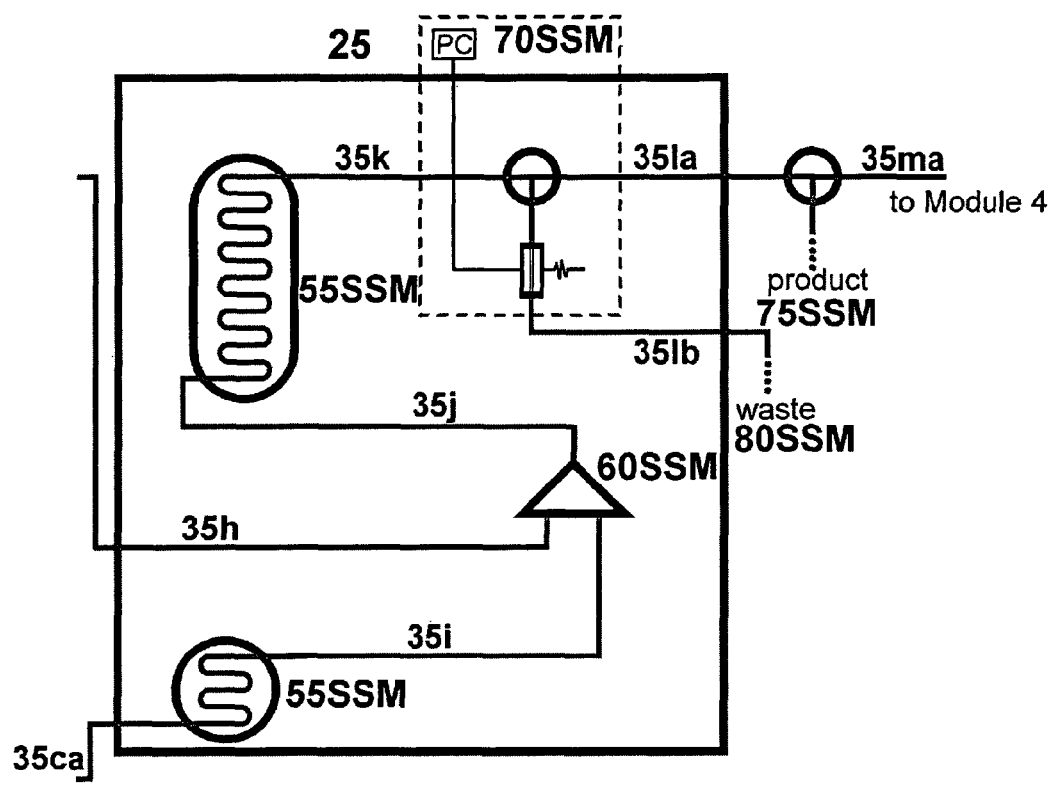

FIG. 1 illustrates an apparatus 10 for the manufacture of nanoparticles according to the present invention. The apparatus 10 according to FIG. 1 depicts three modules 15, 20 and 25 connected to each other in series. The three modules comprise at least one solvent preparation module 15, a particle synthesis module 20 and a shell structure module 25.

In one aspect of the invention, for the manufacture of nanoparticles without a shell, an embodiment of the present invention will comprise only two modules. The two modules will be the solvent preparation module 15 and the particle synthesis module 20, in this aspect of the invention there will be no shell structure module 25.

For the manufacture of core-shell nanoparticles which have a core and at least one shell, a further aspect of the invention requires at least three modules as shown in FIG. 1. The at least three modules are at least one of the solvent preparation module 15, at least one of the particle synthesis module 20 and at least one of the shell structure module 25.

For the manufacture of core-shell-shell nanoparticles which have a core and at least two shells, in a further aspect of the invention, at least four modules are required. The four modules are at least one of the solvent preparation module 15, at least one of the particle synthesis module 20 and at least two of the shell structure module 25.

It should be noted that all components of the apparatus 10 are inert with respect to chemical substances used during and after the manufacture of the nanoparticles.

The solvent preparation module 15 is connected by tubes 35$aa$, 35$ab$ and 35$ac$ to three precursor sources 30$a$, 30$b$ and 30$c$. The precursor sources 30$a$-$c$ comprises the precursors of the nanoparticles to be manufactured.

The solvent preparation module 15 comprises at least three solvent organiser units 45$a$-$c$ and at least three degasser units 40$a$-$c$. Each of the solvent organiser units 45$a$-$c$ and the degasser units 40$a$-$c$ is connected to a separate one of the three precursor sources 30$a$-$c$ by tubes 35$aa$-35$ac$. The purpose of the degasser units 40$a$-$c$ and the solvent organiser unit 45$a$-$c$ is to ensure that the solvents used for the manufacture of the nanoparticles are free from dissolved atmospheric gases and to ensure that the particle precursors are delivered within the apparatus 10 at a rate sufficient to achieve manufacture of the nanoparticles. Each one of the degasser units 40$a$-$c$ and the solvent organiser units 45$a$-$c$ is connected to at least one of three pumps 50$a$, 50$b$ and 50$c$ by tubes 35$ba$, 35$bb$ and 35$bc$.

In the present invention, solutions of particle precursors are pre-prepared and placed in the precursor sources 30$a$-$c$. The particle precursors include precursors of the core of the nanoparticle and precursors of the shell of the nanoparticle (in the case of core-shell nanoparticles or core-shell-shell nanoparticles).

The prepared solutions of particle precursors are pumped to the solvent preparation module 15 and then towards the particle synthesis module 20 via the tube 35$cb$ and the tube 35$cc$ in an aspect where the apparatus 10 is used for the manufacture of nanoparticles that are not core-shell nanoparticles.

The particle synthesis module 20 comprises at least two preheating chambers 55PSMa and 55PSMb. The at least two preheating chambers 55PSMa and 55PSMb are connected to the solvent preparation module 15 by the tubes 35$cb$ and 35$cc$ respectively. The first preheating chamber 55PSMa and the second preheating chamber 55PSMb allow the separate solutions of the particle precursors to be independently and almost simultaneously preheated at variable, independent temperatures. The two independent preheating chambers 55PSMa and 55PSMb allow independent and variable heating, thus ensuring that the stability of the individual particle precursors is not compromised. For example, the NiPt particle precursor cannot be heated to a high temperature as the NiPt particle precursor is thermodynamically unstable and deteriorates under high temperatures. Generally, however, the particle precursors may be preheated in the first preheating chamber 55PSMa and/or the second preheating chamber 55PSMb to the nucleation temperature of the desired nanoparticles to be manufactured. The separate preheated solutions of the particle precursors are then separately pumped to the first nucleation chamber 60PSM via tubes 35da and 35db, where the preheated solutions are mixed and nucleation of the nanoparticles occurs in solution to form a solution containing the nanoparticles.

The temperature of the first nucleation chamber 60PSM is almost identical to the temperature of the at least two preheating chambers 55PSMa and 55PSMb. The solution containing the nanoparticles is then pumped to the first growth chamber 65PSM via tube 35e. In the first growth chamber 65PSM, the solution containing the nanoparticles is subjected to a temperature below that of the nucleation temperature. The lower temperature of the first growth chamber 65PSM, in contrast to the temperature of the first nucleation chamber 60PSM, eliminates spontaneous nucleation within the first growth chamber 65PSM.

The particle synthesis module 20 contains a first analytical device 70PSM that is connected to the first growth chamber 65PSM by a tube 35f. The manufactured nanoparticles are analysed by utilising numerous analytical techniques, such as, absorption and/or emission spectroscopy, light scattering, x-ray diffraction and NMR at the first analytical device 70PSM.

In one aspect of the present invention, the first analytical device 70PSM is connected to at least two exit points 75PSM and 80PSM by tubes 35ga and 35gb respectively. The at least two exit points are at least one of an analysis outlet 80PSM and at least one of a particle collector 75PSM. The analysis outlet 80PSM allows for the manufactured nanoparticles to be collected and analysed as an aid for determining optimum parameters for the manufacture of the nanoparticles. The at least one particle collector 75PSM facilitates the collection of the manufactured nanoparticles after the manufactured nanoparticles have been successfully characterised at the analytic device 70PSM.

In a further aspect of the invention the apparatus 10 further comprises a shell structure module 25. The implementation of the shell structure module 25 is used for the manufacture of the core-shell nanoparticles. Furthermore at least one further shell-structure modules 25 (not shown) can be present for the manufacture of core-shell-shell nanoparticles. The core shell nanoparticles are nanoparticles with a core and a concentric shell and the core-shell-shell nanoparticles are nanoparticles with a core and two concentric shells.

The shell structure module 25 is connected to the particle synthesis module 20 and the solvent preparation module 15. A first connection by a tube 35ca from the solvent preparation module 15 to the at least one preheating chamber 55SSM of the shell structure module 25. A second connection to the shell structure module 25 is with the tube 35h, which connects the particle collector 75PSM of the particle synthesis module 20 to the nucleation chamber 60SSM of the shell structure module 25.

The preheating chamber 55SSM of the shell structure module 25 is connected to the nucleation chamber 60SSM by a tube 35i. The nucleation chamber 60SSM is further connected to a growth chamber 65SSM by a tube 35j.

The shell structure module 25 comprises at least one preheating chamber 55SSM which ensures that a solution of particle precursor from the solvent preparation module 15 is independently heated. Where a solution of the particle precursor is used as a shell in the synthesis of core-shell nanoparticles the solution is preheated to the reaction temperature of the desired core-shell nanoparticle to be manufactured. The shell structure module 25 further comprises a shell nucleation chamber 60SSM. The temperature of the shell nucleation chamber 60SSM is pre-set to a shell reaction temperature of the core-shell nanoparticle to be manufactured. The reaction temperature is distinguished from the nucleation temperature, because the shell material would otherwise form nuclei and lead to the formation of separate particles and not to the formation of a shell structure. The shell nucleation chamber 60SSM of the shell structure module 25 is further connected to a growth chamber 65SSM which has an independent temperature control that is set to a substantially similar temperature as the temperature of the shell nucleation chamber 60SSM. The similar temperature of the shell growth chamber 65SSM and the shell nucleation chamber 60SSM ensures spontaneous formation of core particles is avoided and thus promotes shell growth.

The growth chamber 65SSM of the shell structure module 25 is connected to an analytical device 70SSM by a tube 35k. The manufactured core shell-nanoparticles are analysed by absorption and/or emission spectroscopy, light scattering, x-ray diffraction and NMR at the analytical device 70SSM.

In an aspect of the invention where the apparatus is used for the manufacture of core-shell nanoparticles, the analytical device 70SSM is connected to at least two exit points 75SSM and 80SSM by tubes 35la and 35lb respectively. The at least two exit points are at least one of an analysis outlet 80SSM and at least one of a particle collector 75SSM. The analysis outlet 80PSM allows the manufactured nanoparticles to be collected and analysed enabling the determination of optimum manufacturing parameters. The at least one particle collector 75SSM facilitates the collection of the manufactured nanoparticles after the manufactured nanoparticles have been successfully characterised at the analytic device 70SSM.

The shell structure module 25 may or may not be present in the apparatus 10. If the shell structure module 25 is present and the apparatus 10 is not intended for the manufacture of core shell nanoparticles then the shell structure module 25 is not utilised in this aspect of the invention.

According to a further aspect of the present invention, a particle isolation module 30 is connectable to the particle collector 75. The particle isolation module 30 is used to isolate nanoparticles, manufactured according to the present invention.

The particle isolation module 30 can be connected to the particle collector 75PSM of the particle synthesis module 20, via tube 35na. In this instance the particle isolation module 30 is used to isolate manufactured nanoparticles that do not comprise a shell.

In a further aspect of the present invention the particle isolation module 30 can be connected to the particle collector 75SSM of the shell structure module 25, via tube 35na. In this instance the particle isolation module 30 is used to isolate manufactured nanoparticles that comprise a shell (i.e. coreshell nanoparticles).

The particle isolation module 30 as mentioned is connectable to the particle collector 75 by a tube 35na. The tube 35na of the particle isolation module is connected to a nucleation chamber 60PIM present in the particle isolation chamber. A solvent module 30 is also part of the particle isolation module and this is connected by a tube 35m to a pump 50d present in the particle isolation module 30. The pump 50d is connected to the nucleation chamber 60PIM by a tube 35nb. The nucleation chamber 60PIM is connected to a flow centrifuge 85PIM.

Nanoparticles manufactured according to the present invention are isolated from solvent, excess ligand and any un-reacted precursor reagents by the use of the particle isolation module 30. The pump 50d is used for pumping solvents (e.g. ethanol) and is connected to the other inlet of the nucleation chamber 60PIM. An outlet of the nucleation chamber 60PIM is connected to the continuous flow centrifuge, where the manufactured nanoparticles are separated from a liquid phase. The manufactured nanoparticles are obtained by re-dissolving the manufactured nanoparticles with a solvent such as chloroform or toluene.

In aspects of the invention following the completion of the manufacture of the nanoparticles the apparatus 10 is flushed with a solvent from the solvent preparation module 15 to render the apparatus 10 clean and usable for the next manufacturing process.

Figure 2:
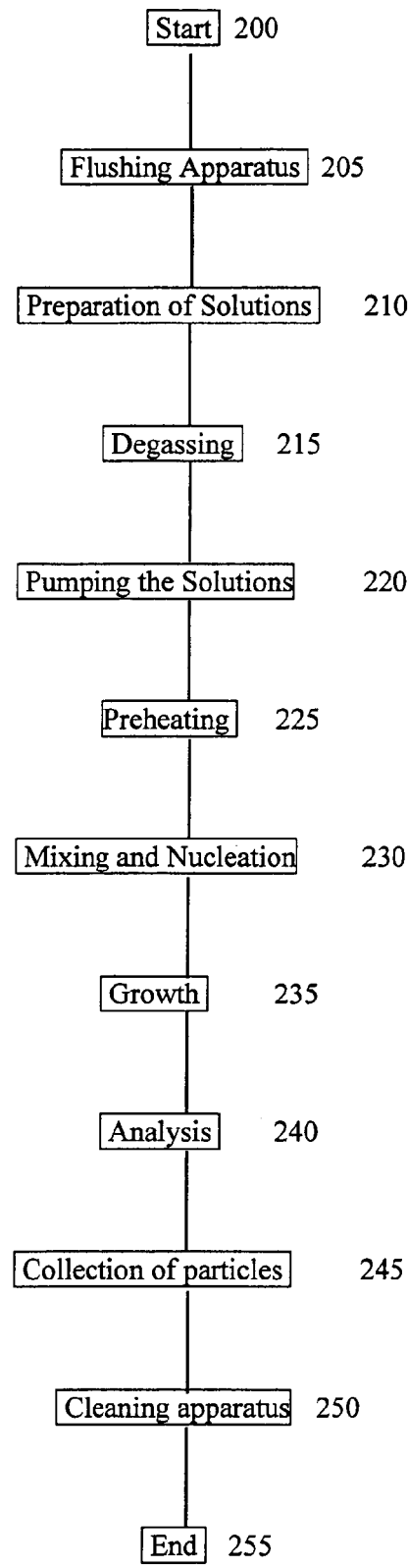
FIG. 2 illustrates a method for the manufacture of nanoparticles according to the present invention.
Figure 3:
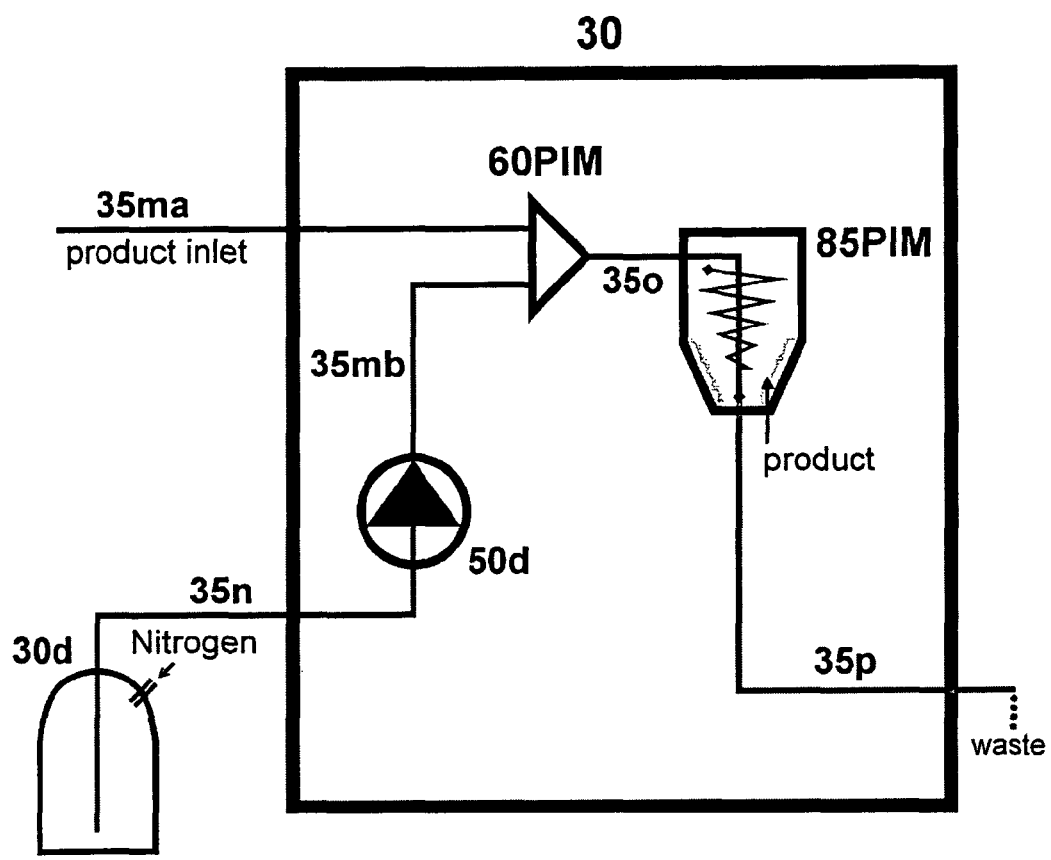
FIG. 3 depicts a particle isolation module for the isolation of manufactured nanoparticles according to an aspect of the present invention.

The method will now be described with respect to FIG. 2. FIG. 2 represents a flow chart for the method of manufacturing the nanoparticles using the apparatus 10.

The method 200 comprises initially flushing in step 205 the apparatus 10 via all of the tubes 35 in the apparatus 10. At least two solutions of the particle precursors are then prepared as in step 210 and placed in the precursor sources 30a-c. The at least two solutions of particle precursor are prepared by dissolving the particle precursor in a solvent for the preparation of the nanoparticles. Where the apparatus 10 is to be used for the manufacture of a core shell nanoparticle, at least one of the particle precursors is a nanoparticle manufactured previously and the at least other particle precursor solution comprises a shell species which is pre-prepared and placed in the at least one particle precursor source 30a.

In most cases the solvent used for the preparation of solutions of particle precursor is squalene. Furthermore the solvent can also be in the form of a co-ordinating stabilizer such as TOP (Tri Octyl Phosphine) and TOPO (Tri Octly Phoshine Oxide).

An advantage of using squalene during the manufacture of the nanoparticles is that squalene has a low melting temperature and a high boiling temperature. Squalene is therefore a liquid over a broad temperature range and is a solvent which is suitable for the manufacture of the nanoparticles across the broad temperature range.

Once the at least two solutions of particle precursor have been prepared the at least two solutions of particle precursor are separately degassed (step 215) by at least two degasser units 40b and 40c. The step 215 ensures that the at least two solutions of particle precursor are free from any dissolved gases and atmospheric air which could potentially lead to unwanted side reactions and/or contaminate the manufactured nanoparticles, thus ensuring that the manufactured nanoparticles are not contaminated by unwanted side reactions.

The degassed solutions of particle precursors are then pumped in step 220 individually and almost simultaneously through the particle synthesis apparatus 10 by the pumps 50b and 50c via the tubes 35cb and 35cc. Once the simultaneous pumping in step 220 of the solutions of the particle precursors begins, the solutions are pumped initially to the particle synthesis module 20.

In the particle synthesis module 20 the at least two solutions of particle precursor are independently and almost simultaneously preheated as in step 225 in the at least two preheating chambers 55PSMa and 55PSMb. The temperature of the at least two preheating chambers 55PSMa and 55PSMb is preset to the nucleation temperature of the nanoparticles to be manufactured.

In a further aspect of the invention where the apparatus 10 is used for the manufacture of nanoparticles, the at least two preheating chambers 55PSMa and 55PSMb may or may not preheat a solution of the particle precursor.

The two separate preheated solutions of the particle precursor are then separately pumped to the nucleation chamber 60PSM via tubes 35da and 35db, where the two solutions mix and nucleation occurs as in step 230.

Following nucleation in the nucleation chamber 60PSM, the solution of the nucleated nanoparticles is then pumped to the growth chamber 65PSM via the tube 35e where growth of the manufactured nanoparticles occurs as in step 235. The temperature of the growth chamber 65PSM is preset to a lower temperature than the temperature of the nucleation chamber 60PSM. The lower temperature of the growth chamber 65PSM enables that the nanoparticles that are manufactured can be grown at a uniform rate and allows the manufactured nanoparticles to attain a substantially uniform size.

The manufactured nanoparticles are then analysed in situ by collection at an analytical device 70PSM as in step 240.

Once the nanoparticles have grown to the desired size they are collected as in step 245 from the solution by precipitation induced by the addition of a polar organic solvent such as alcohol. Following precipitation of the desired nanoparticles from the solution, the solution may be subjected to centrifugation to obtain the desired nanoparticles. The centrifugation is achieved by connecting the particle isolation module 30 to the outlet 75PSM as described above.

In a further aspect of the present invention where the apparatus 10 is used for the manufacture of core-shell nanoparticles a further module being the core-shell module 25 is attached to the particle synthesis module 20 as discussed earlier. In the method for the manufacture of core-shell nanoparticles, the method similarly follows the method as depicted in FIG. 2 and described above for the manufacture of nanoparticles.

In the aspect of the invention where the apparatus 10 is used for the manufacture of core-shell nanoparticles, there are at least two separate solutions of particle precursor. At least one of the solutions of particle precursor is a solution of nanoparticles manufactured form an earlier manufacturing method and the at least one other solution is that of the particle precursor of a shell component.

A difference in the manufacturing method for core-shell nanoparticles is that once the nanoparticles from an earlier manufacturing method are manufactured, these manufactured nanoparticles are not collected from the solution as in step 245. A particle precursor solution of the shell component is prepared as in step 210 and is pumped via the tubes 35ba, 35ca to the shell synthesis module 25.

The solution of particle precursor in the manufacture of the core-shell nanoparticles is independently preheated as in step 225 in the preheating chamber 55SSM of the shell structure module 25. The steps 225 to 255 are continued as described for the manufacture of non-core shell nanoparticles. However the particle solution of the core must not be pre-heated as this would lead to an undesirable core-reaction.

In yet a further aspect of the present invention the apparatus 10 is used for the manufacture of core-shell-shell nanoparticles. The method for the manufacture of the core-shell-shell nanoparticles is almost similar to the method for the manufacture of core shell-particles.

In this aspect of the invention there are at least two separate solutions of particle precursors. However at least one of the solutions is a solution of a core-shell nanoparticle manufactured form an earlier manufacturing method and the at least one other solution is that of the particle precursor of a shell component prepared in the solvent preparation module 25.

In a further aspect of the invention for the manufacturing method of core-shell-shell nanoparticles is that once the nanoparticles from an earlier manufacturing method are manufactured, these manufactured nanoparticles are not collected from the solution as in step 245. Also a particle precursor solution of the shell component is prepared in step 210, the solution is again degassed as in step 215.

The two separate solutions of particle precursors are then pumped 220 independently and at least one of the particle precursor solutions may be preheated 225 in a single preheating chamber of the second shell structure module 25 (not shown). The steps 225 to 255 are continued as described for the manufacture of core-shell nanoparticles to yield the manufactured core-shell-shell nanoparticles In aspects of the invention whereby the manufactured nanoparticles are collected as in step 245, the apparatus 10 is cleaned as in step 250. The cleaning step 250 involves flushing the entire apparatus 10 with pure solvent. The pure solvent being the same solvent as that used during the manufacture of nanoparticles. The apparatus 10 is flushed by pumping pure solvent through the apparatus from the solvent preparation module 15 to a collection point 75 and or to the analysis outlet 80. The apparatus 10 is then allowed to cool.

EXAMPLES

The following examples demonstrate the various aspects of the invention but are not intended to limit the invention.

Example 1

Preparation of CdSe Nanoparticles

Preparation of Cd particle precursor solution. 1.15 g of cadmium acetate was mixed with 45 ml of squalene and 3.5 ml of the stabilizer oleic acid at room temperature furthermore 20 ml of the stabilizer oleylamine was added. The resulting suspension was evacuated and purged with nitrogen gas. The suspension was then heated to 150° C. to form an opaque slightly yellow solution. The solution was then degassed at reduced pressure for 2 hours at 100° C. before being allowed to cool to room temperature. The mixture was then evacuated and kept under an inert atmosphere of nitrogen gas.

Preparation of Se particle precursor solution. In a glove box at room temperature 2.0 g of selenium was dissolved in 17 ml trioctylphosphine. To the solution was added 53 ml of squalene. The resultant solution was stored in an inert atmosphere.

Preparation of CdSe nanoparticles. The cadmium and selenium solution were connected to 2 pumps and aspirated in the solvent preparation module 15. The temperature of the nucleation chamber 60 is set to the intended nucleation temperature. The growth chamber 65 temperature is set to the growth temperature and the preheating chamber 55 temperature is set to the nucleation temperature. Afterwards the flow of the pumps 50 is set in such a way that the particle precursors stay within the apparatus 10 and the mixing ratio corresponds to the indented parameter values. The residence time is the time taken for mixture of particle precursors to enter the nucleation chamber 60 and exit the growth chamber 65. After double the residence time the optical properties of the manufactured nanoparticles may be measured. The intended parameter values are values of flow rate and temperature determined from trial experiments that provide the optimum conditions for the manufacture of nanoparticles.

After finishing the production the apparatus 10 is flushed with pure solvent and allowed to cool.

Example 2

Preparation of NiPt Nanoparticles

Preparation of Ni particle precursor solution. 0.84 g of nickel acetate and 0.90 g of 1,2-hexadecanediol was dissolved in 192 ml of squalene and 4.0 ml of the stabilizer oleic acid and 4.0 ml of oleylamine was added (by injection). The mixture was heated for 3 hours at 80° C. to form an opaque blue-green solution. The solution was then evacuated and purged in an inert atmosphere of nitrogen gas.

Preparation of Pt particle precursor solution. A mixture of 1.26 g of Platinum(II)-acetylacetonate, 80 ml of 1,2 dichlorobenzol and 120 ml of the stabilizer squalene was heated to 50° C. The resultant solution was stored under a nitrogen atmosphere.

Preparation of NiPt nanoparticles. The nickel and platinum particle precursor solutions were connected to two pumps and aspirated in the solvent preparation module 15, the temperature of nucleation chamber 60 is set to the intended nucleation temp. The temperature of the growth chamber 65 is set to the growth temperature and the preheating chamber 55 temperature is preset to the nucleation temperature. Afterwards the flow of the pumps 50 is set in such a way that the particle precursors stay within the apparatus 10 and the mixing ratio corresponds to the indented parameter values. The residence time is the time taken for mixture of particle precursors to enter the nucleation chamber 60 and exit the growth chamber 65. After double the residence time the optical properties of the manufactured nanoparticles may be measured. The intended parameter values are values of flow rate and temperature determined from trial experiments that provide the optimum conditions for the manufacture of nanoparticles.

After finishing the manufacture of the nanoparticles the reactor is flushed with pure solvent and allowed to cool.

Example 3

Preparation of PbTe Nanoparticles

Preparation of Pb particle precursor solution. 24.3 g of lead acetate was dissolved in 320 ml of squalene and 64 ml of the stabilizer oleic acid and 16 ml of oleylamine was added (by injection). The mixture was heated for 3 hours at 80° C. to form a yellowish solution. The solution was then evacuated and kept stored in an inert atmosphere of nitrogen.

Preparation of Te particle precursor solution. 4.78 g of tellurium was mixed with 150 ml of trioctylphosphine and 250 ml of squalene. The resultant mixture was then heated to 250° C. The resultant solution was stored under a nitrogen atmosphere.

Preparation of PbTe nanoparticles. The lead and tellurium particle precursor solutions were connected to two pumps and aspirated in the solvent preparation module 15. The nucleation chamber 60 temperature was set to the intended nucleation temperature. The growth chamber 65 temperature was set to the growth temperature and the preheating chamber 55 temperature was set to the nucleation temperature. Afterwards the flow of the pumps 50 was set in such a way that the particle precursors stay within the apparatus and the mixing ratio corresponds to the indented parameter values. The residence time is the time taken for mixture of particle precursors to enter the nucleation chamber 60 and exit the growth chamber 65. The intended parameter values are values of flow rate and temperature determined from trial experiments that provide the optimum conditions for the manufacture of nanoparticles.

After double the residence time the optical properties of the manufactured nanoparticles may be measured.

After finishing the manufacture of the nanoparticles, the apparatus 10 is flushed with pure solvent and allowed to cool.

Example 4

Preparation of CdSe—CdS Core-Shell Nanoparticles

Preparation of CdS particle precursor solution. 432 mg of cadmium acetate was dissolved in 15 ml of trioctylphosphine at room temperature. Subsequently 1.1 ml of trimethyl silyl sulphide was added and then 150 ml of squalene was added. The solution remained clear and of a yellow colour. This solution is the CdS particle precursor solution and can be used as a shell precursor.

Preparation of CdSe nanoparticles was performed as described in Example 1 above.

Preparation of CdSe—CdS Core-Shell nanoparticles. The temperature of the nucleation chamber 60SSM and the temperature of the growth chamber 65SSM of the shell structure module 25 are set to the same temperature. In this instance the same temperature is to promote growth, and avoid nucleation. The temperature of the preheating chamber 55SSM remains at room temperature to avoid the formation of CdS core particles. Afterwards the flow of the pumps 50 was set in such a way that the particle precursors stay within the apparatus and the mixing ratio corresponds to the intended parameter values. The residence time is the time taken for mixture of particle precursors to enter the nucleation chamber 60 and exit the growth chamber 65. The intended parameter values are values of flow rate and temperature determined from trial experiments that provide the optimum conditions for the manufacture of nanoparticles.

After finishing the manufacture of the nanoparticles, the apparatus 10 is flushed with pure solvent and allowed to cool.

Example 5

Preparation of CdTe Nanoparticles

Preparation of Cd particle precursor solution. 3.92 g of cadmium acetate and 7.65 g of tetradecyl phosphonic acid was mixed with 100 ml of trioctylphosphine and 443 mL of octadecene. The resultant mixture was then heated to 250° C. The resultant solution was stored under an atmosphere of nitrogen.

Preparation of Te particle precursor solution. 2.55 g of tellurium was mixed with 100 ml of trioctylphosphine and 150 ml octadecene. The resultant mixture was then heated to 250° C. The resultant solution was stored under an atmosphere of nitrogen.

Preparation of CdTe nanoparticles. The cadmium particle precursor solution and the tellurium particle precursor solution were connected to separate pumps and aspirated in the solvent preparation module 15. The temperature of the nucleation chamber 60 is set to the intended nucleation temperature. The growth chamber 65 temperature is set to the growth temperature and the preheating chamber 55 temperature is set to the nucleation temperature. Afterwards the flow of the pumps 50 is set in such a way that the particle precursors stay within the apparatus 10 and the mixing ratio corresponds to the indented parameter values. The residence time is the time taken for mixture of particle precursors to enter the nucleation chamber 60 and exit the growth chamber 65. After double the residence time the optical properties of the manufactured nanoparticles may be measured. The intended parameter values are values of flow rate and temperature determined from trial experiments that provide the optimum conditions for the manufacture of nanoparticles.

Having thus described the present invention in detail, it is to be understood that the foregoing detailed description of the invention is not intended to limit the scope of the invention thereof. What is desired to be protected by letters patent is set forth in the following claims.

REFERENCE NUMERALS

10 Apparatus for the manufacture of nanoparticles
15 Solvent preparation module
20 Particle synthesis module
25 Shell structure module
30 Particle isolation module
30a-c Precursor source
35 Tubes
40a-c Degasser units
45a-c Solvent organiser units
50a-d Pumps
55 Preheating chamber
60 Nucleation chamber
65 Growth chamber
70 Analytical device
75 Particle collector
80 Analysis outlet
85 Flow centrifuge
200 Method for the manufacture of nanoparticles
205 Flushing apparatus
210 Preparation of particle precursor solution
215 Degassing particle precursor solution
220 Pumping
230 Nucleation of nanoparticles
235 Growth of nanoparticles
240 Analysis of nanoparticles
245 Collection of manufactured nanoparticles

The invention claimed is:

1. An apparatus for the continuous manufacture of nanoparticles, comprising: at least one solvent preparation module; and at least one particle synthesis module having at least three independently heatable chambers, wherein the at least one solvent preparation module is connected in series with the at least one particle synthesis module and wherein the three independently heatable chambers include a separate nucleation chamber and a separate growth chamber.

2. The apparatus according to claim 1, whereby the at least three independently heatable chambers of the particle synthesis module comprises: a preheating chamber for individually and substantially simultaneously preheating at least two separate solutions of particle precursors; a nucleation chamber for mixing the at least two separate solutions of particle precursors and nucleating the at least two particle precursors; and a growth chamber for the growth of the particles.

3. The apparatus according to claim 2, wherein the preheating chamber comprises at least one and no more than two preheating chambers.

4. The apparatus according to claim 1, wherein at least one of the solvent preparation modules is connected to a precursor source.

5. An apparatus according to claim 1, wherein the solvent preparation module comprises: at least one degasser unit and at least one solvent organizer unit.

6. The apparatus according to claim 5, whereby the at least one degasser unit and/or the at least one solvent organizer unit is connected to at least one of the precursor sources.

7. The apparatus according to claim 2, further comprising: an analytical device connected to the growth chamber.

8. The apparatus according to claim 1, further comprising at least one shell structure module for the synthesis of core shell particles, the at least one shell structure module being connected to the at least one particle synthesis module.

9. The apparatus according to claim 8, wherein the at least one shell structure module comprises: at least one preheating chamber connected to at least one of a plurality of degasser units and connected to at least one of a plurality of solvent organizer unit of the solvent preparation module, a nucleation chamber connected to the growth chamber and being connected to an analytical device connected to a particle collector and an analysis outlet.

10. The apparatus according to claim 8, further comprising at least a second shell structure module connected to the at least one first shell structure module for the manufacture of core-shell-shell particles.

11. The apparatus of claim 9, further comprising at least one pump connected between the at least one degasser unit and the at least one solvent organizer unit to control the flow of the particle precursor solutions through the apparatus.

12. The apparatus of claim 11, wherein the at least one pump is made of an inert material.

13. The apparatus of claim 9, wherein the analytical device comprises at least one of a group consisting of:
   an absorption—emission spectrometer
   a x-ray crystallography device
   a light scattering measurement device
   a NMR spectrometer.

14. The apparatus of claim 1, wherein the apparatus is inert with respect to the particle reactants used for the manufacture of the particles.

15. The apparatus according to claim 1, further comprising an analysis outlet for in situ collection and analysis of manufactured nanoparticles.

16. The apparatus according to claim 15, wherein the analysis outlet is connected to an analytical device.

17. The apparatus according to claim 1, further comprising a particle collector for collecting the manufactured particles.

18. The apparatus according to claim 17, wherein the particle collector is connected to at least one analytical device.

19. The apparatus according to claim 18, wherein the particle collector is connected between the at least one particle synthesis module and a shell structure module.

20. The apparatus according to claim 1, further comprising a particle isolation module.

21. The apparatus according to claim 20, wherein the particle isolation module comprises a flow centrifuge for the isolation of the manufactured nanoparticles.

22. A method for the continuous manufacture of nanoparticles comprising: preparing at least two solutions of particle precursors, separately and substantially simultaneously preheating the at least two solutions of particle precursors at a first temperature, the first temperature being at least the nucleation temperature of the particles, mixing the at least two solutions of particle precursors in a nucleation chamber at a second temperature, the second temperature being substantially the same as the first temperature to form the nanoparticles, growing the particles in a growth chamber at a third temperature, wherein the third temperature is less than the first temperature.

23. The method according to claim 22, comprising degassing of the at least two solutions of the particle precursors.

24. The method according to claim 22, wherein squalene is used for the preparation of at least one of the at least two solutions of particle precursors.

25. The method according to claim 22 comprising manufacture of core-shell particles comprising providing at least one solution of the particles and at least one solution of a shell particle precursor.

26. The method according to claim 25, as carried out in an apparatus for manufacture of particles, wherein the apparatus is washed with solvent before commencing the manufacture of core-shell particles.

27. The method according to claim 22, wherein one of the solutions of particle precursors is an acetate selected from the group consisting of Pb, Cd, Ni or Pt.

28. The method according to claim 22, wherein one of the solutions of particle precursors is selected from an elemental solution of Te or Se.

29. The method of claim 22, wherein one of the solutions of particle precursors is a solution of the nanoparticles.

30. The method of claim 22, wherein the manufactured nanoparticles are isolated by a centrifuge.

* * * * *